United States Patent [19]

Koenig

[11] 4,413,105

[45] Nov. 1, 1983

[54] STABILIZED THERMOSETTABLE ETHYLENICALLY UNSATURATED EPOXY ESTER RESIN COMPOSITIONS

[75] Inventor: Raymond Koenig, Vendenheim, France

[73] Assignee: The Dow Chemical Company, Midland, Mich.

[21] Appl. No.: 377,495

[22] Filed: May 12, 1982

[30] Foreign Application Priority Data

May 15, 1981 [EP] European Patent Office . 81/03738

[51] Int. Cl.³ .................. C08L 61/12; C08G 283/10; C08L 63/10
[52] U.S. Cl. .................. 525/482; 525/524; 525/531
[58] Field of Search ............ 525/524, 531, 482, 484, 525/922, 31

[56] References Cited

U.S. PATENT DOCUMENTS

| | | | |
|---|---|---|---|
| 3,301,743 | 1/1967 | Fekete et al. | 525/531 |
| 3,524,901 | 8/1970 | Najvar | 525/31 |
| 4,253,918 | 3/1981 | Traenckner et al. | 525/531 |
| 4,309,473 | 1/1982 | Minamisawa et al. | 525/31 |

FOREIGN PATENT DOCUMENTS 39-1817  2/1964  Japan .

*Primary Examiner*—Wilbert J. Briggs, Sr.
*Assistant Examiner*—Robert E. L. Sellers

[57] ABSTRACT

This invention is directed to thermosettable ethylenically unsaturated epoxy ester resin compositions having improved storage stability and to a method for improving the storage stability of such compositions by adding an anaerobically effective polymerization inhibitor to the resin composition. The resin composition comprises the reaction product of a bisphenol-base epoxy resin, a novolac-base epoxy resin, or a mixture thereof with an ethylenically unsaturated monocarboxylic acid dissolved in a polymerizable monomer containing a $>C=CH_2$ group. The polymerization inhibitors of this invention are 4-chloro-2-nitrophenol, 2,4-dichloro-6-nitrophenol, or mixtures thereof.

6 Claims, No Drawings

STABILIZED THERMOSETTABLE ETHYLENICALLY UNSATURATED EPOXY ESTER RESIN COMPOSITIONS

BACKGROUND OF THE INVENTION

It is well recognized that in the preparation of the thermosettable ethylenically unsaturated epoxy ester compositions that a polymerization inhibitor such as hydroquinone or phenothiazine must be added and that air or oxygen must be bled into the reactor in order to keep the polymerization inhibitor active. In the absence of oxygen, the reaction mixtures polymerize inhibitor quickly to an unusable mass. More recently, it has become known that the shelf life or stability of ethylenically unsaturated epoxy ester compositions containing a conventional polymerization inhibitor such as hydroquinone, methyl hydroquinone or phenothiazine is also dependent upon the presence of oxygen in the resin composition to keep the polymerization inhibitor active. The storage stability problem is most noticeable when resin compositions are shipped during periods of high outdoor temperatures and also when the resin compositions are stored for prolonged periods of time. U.S. Pat. No. 4,129,609 teaches that the storage stability of these resin compositions is improved by employing as the polymerization inhibitor a thiuram compound containing a group expressed by the structural formula:

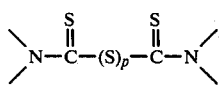

The use of dinitrophenols, tertiary butyl catechol and alkyl hydroquinones as inhibitors of free radical polymerization which enhance the storage stability of unsaturated polyester resins and unsaturated epoxy ester resins is taught in U.S. Pat. No. 4,083,890.

Japanese Patent Publication No. 52-108478/1977 is directed to unsaturated epoxy ester resin compositions to which hydroquinone and a mononitrophenol have been added to control the tendency to generate heat while forming a gel during polymerization. Mononitrophenols employed in the examples are o-nitrophenol, 2-nitro-p-cresol, and 4-nitrocatechol.

It would be desirable to have anaerobically effective polymerization inhibitors which greatly extend the shelf life without adverse effects on the curability of the resin compositions. U.S. Pat. No. 4,129,609 teaches that nitro compounds are not anaerobically effective polymerization inhibitors regardless of the amount employed. Anaerobically effective polymerization inhibitors are those inhibitors that are effective at very low levels of oxygen down to the absence of oxygen.

SUMMARY OF THE INVENTION

This invention is directed to thermosettable ethylenically unsaturated epoxy ester resin compositions stabilized against premature polymerization or gelation and to a method for preparing the stabilized compositions. More particularly, it is directed to a thermosettable resin composition having improved storage stability comprising the reaction product of a bisphenol-base epoxy resin, a novolac-base epoxy resin, or mixtures thereof with an ethylenically unsaturated monocarboxylic acid, a polymerizable monomer containing a $>C=CH_2$ group and an anaerobically effective polymerization inhibitor selected from the group consisting of 4-chloro-2-nitrophenol, 2,4-dichloro-6-nitrophenol, and mixtures thereof. Preferably the polymerization inhibitor is 4-chloro-2-nitrophenol.

This invention is also directed to a method for improving storage stability of a thermosettable ethylenically unsaturated epoxy ester resin composition by adding an anaerobically effective polymerization inhibitor selected from the group consisting of 4-chloro-2-nitrophenol, 2,4-dichloro-6-nitrophenol, and mixtures thereof to the thermosettable resin composition, the thermosettable resin composition comprising the reaction product of a bisphenol-base epoxy resin, a novolac-base epoxy resin, or a mixture thereof with an ethylenically unsaturated monocaboxylic acid and a polymerizable monomer containing a $>C=CH_2$ group. Preferably 4-chloro-2-nitrophenol is added as the polymerization inhibitor.

DESCRIPTION OF THE INVENTION

It has been unexpectedly found that 4-chloro-2-nitrophenol, 2,4-dichloro-6-nitrophenol, or mixtures thereof are anaerobically effective in improving the storage stability of ethylenically unsaturated epoxy ester resin compositions wherein the composition comprises the reaction product of a bisphenol-base epoxy resin, a novolac-base epoxy resin, or mixtures thereof with an ethylenically unsaturated monocarboxylic acid and a polymerizable monomer containing a $>C=CH_2$ group. The preferred polymerization inhibitor of this invention is 4-chloro-2-nitrophenol.

Polymerization inhibitors of this invention may be used in combination with conventional polymerization inhibitors such as, for example, hydroquinone, methyl hydroquinone, methyl ether of hydroquinone and phenothiazine. The preferred use level for inhibitors of this invention is from 10 to 5,000 parts by weight per million parts by weight of the resin composition. More preferably, the use level is 10 to 500 parts per million. The preferred use level of the conventional inhibitors when employed is 10 to 10,000 parts by weight per million parts by weight of resin composition. More preferably, the use level is 10 to 500 parts per million.

The bisphenol-base epoxy resins suitable for the preparation of the ethylenically unsaturated epoxy ester resin compositions are prepared from bisphenols and epihalohydrins by methods well known in the art. Bisphenol-base epoxy resins are those expressed by the general formula:

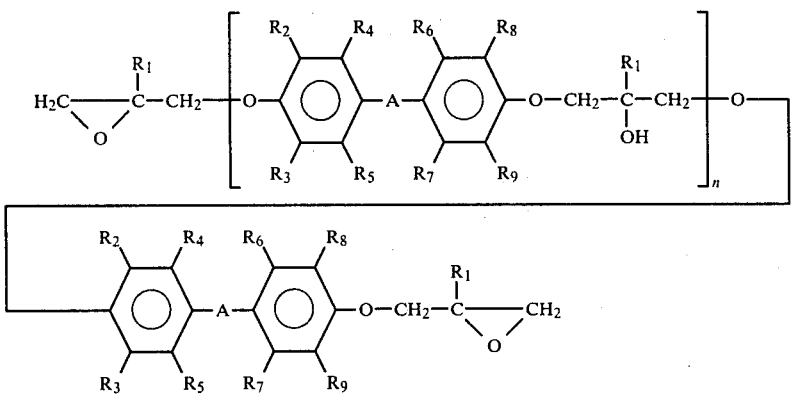

wherein $R_1$ is hydrogen or methyl; $R_2$, $R_3$, $R_4$, $R_5$, $R_6$, $R_7$, $R_8$ and $R_9$ are independently hydrogen, chlorine or bromine; A is a $C_1$ to $C_8$ alkylene group, $-S-$, $-S-S-$,

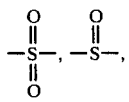

or $-O-$, and n is a number from 0 to 10. Preferred bisphenol-base epoxy resins have epoxy equivalent weights ranging from 170 to 1,600.

The novolac-base epoxy resins suitable for the preparation of the ethylenically unsaturated epoxy ester resin compositions are prepared from novolac resins and epihalohydrins by methods well-known in the art. Novolac-base epoxy resins are those expressed by the general formula:

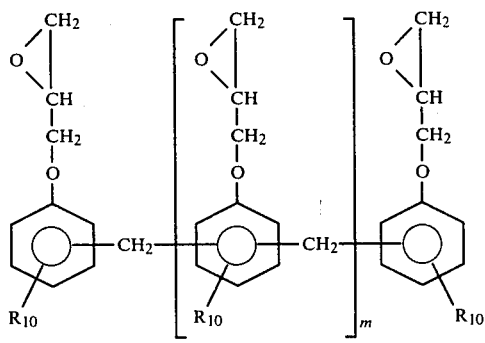

wherein $R_{10}$ is hydrogen or methyl, and m is a number from 0 to 12.

Ethylenically unsaturated monocarboxylic acids suitably reactive with the bisphenol-base epoxy resin, novolac-base epoxy resin, or mixtures thereof include the α,β-unsaturated monocarboxylic acids and the hydroxyalkyl acrylate and methacrylate half esters of dicarboxylic acids. The α,β-unsaturated monocarboxylic acids include acrylic acid, methacrylic acid, crotonic acid and cinnamic acid. The hydroxyalkyl group of the acrylate or methacrylate half esters preferably contains 2 to 6 carbon atoms and includes such groups as hydroxyethyl, β-hydroxypropyl and β-hydroxybutyl. It is also intended to include those hydroxyalkyl groups in which an ether oxygen is present. The dicarboxylic acids can be either saturated or unsaturated. Saturated dicarboxylic acids include phthalic acid, chlorendic acid, tetrabromophthalic acid, adipic acid, succinic acid and glutaric acid. Unsaturated dicarboxylic acids include maleic acid, fumaric acid, citraconic acid, itaconic acid, halogenated maleic and fumaric acids and mesaconic acid. Mixtures of ethylenically unsaturated carboxylic acids may be used.

Preferably, the half esters are prepared by reacting substantially equal molar proportions of a hydroxyalkyl acrylate or hydroxyalkyl methacrylate with a dicarboxylic acid anhydride. Preferred unsaturated anhydrides include maleic anhydride, citraconic anhydride and itaconic anhydride. Preferred saturated anhydrides include phthalic anhydride, tetrabromophthalic anhydride and chlorenddic anhydride. Advantageously, a polymerization inhibitor such as hydroquinone or the methyl ether of hydroquinone may be added to the reaction mixture since elevated temperatures are useful in preparing the half esters. The reaction temperature may range from 20° to 150° C., preferably from 80° to 120° C.

The epoxy ester resin per se can be readily prepared by any of the known methods. One of the methods is that which comprises reacting an epoxy resin with an α,β-unsaturated monocarboxylic acid such that 1 equivalent of the epoxy group reacts with 0.8 to 1.2 equivalents of the carboxylic acid group in the presence of a reaction catalyst which includes tertiary amines such as, for example, triethylamine or tris(dimethylaminomethyl)phenol, and phosphines such as, for example, triphenylphosphine and a polymerization inhibitor such as, for example, hydroquinone, 2-methyl hydroquinone, tertiary butyl catechol or phenothiazine, at a temperature of 80° to 160° C. During the reaction, air is bled into the reactor to keep the polymerization inhibitor active. The reaction is continued until the acid content as COOH drops below 1 percent by weight. The resulting epoxy ester resin containing secondary hydroxyl groups resulting from the epoxy-acid reaction may be further reacted with from 0.1 to 1.2 mole proportions of dicarboxylic anhydride per equivalent of the initial epoxide. The dicarboxylic anhydride can be added to the reactants at any time during the epoxy-α,β-unsaturated monocarboxylic acid reaction at a given epoxy conversion. The dicarboxylic acid anhydride may be selected from either the saturated or unsaturated dicarboxylic acid anhydrides previously described or mixtures thereof. Maleic anhydride is the preferred unsaturated dicarboxylic anhydride. Phthalic anhydride is the preferred saturated dicarboxylic anhydride. A reaction temperature from 25° to 150° C. is suitable but 80° to 120° C. is preferred.

Following completion of the reaction, the reaction mixture is cooled and the epoxy ester resin is dissolved in a polymerizable monomer containing a $>C=CH_2$ group. Representative species are the vinyl aromatic compounds which include such monomers as, for example, styrene, vinyltoluene, α-methylstyrene, halogenated styrenes and divinylbenzene. Other suitable monomers include, for example, the methyl, ethyl, isopropyl and octyl esters of acrylic and methacrylic acid, ethylene glycol diacrylate and dimethacrylate, vinyl acetate, diallyl maleate, diallyl phthalate, dicyclopentadiene acrylate and mixtures thereof. Preferred polymerizable monomers are vinyl aromatic monomers such as, for example, styrene, vinyltoluene, di-, tri- and tetrahalo styrenes, various alpha-substituted styrenes and vinylnaphthalenes and the hydroxyalkyl and alkyl esters of acrylic acid, methacrylic acid and crotonic acid.

The amount of polymerizable monomer in the epoxy ester resin composition is in the range of from 10 to 70 percent by weight, preferably from 30 to 60 percent by weight, based upon the epoxy ester resin and the polymerizable monomer. With an amount less than 10 percent by weight, the resin composition becomes too high in viscosity and is thus not practical. Amounts of monomer larger than 70 percent by weight will lower the physical properties of the cured composition due to the lack in the amount of epoxy ester resin.

The polymerization inhibitors of this invention are usually added to the prepared epoxy ester resin composition either before or after the epoxy ester resin is dissolved in the polymerizable monomer. These inhibitors may also be added to the reactants and used during the preparation of the epoxy ester resin. It is preferred to add the inhibitors of this invention to the resin composition after the epoxy ester resin has been prepared.

As a matter of course, a mixture of two epoxy resins having different epoxy equivalent weights is usable for reaction with an ethylenically unsaturated monocarboxylic acid. For example, a mixture of a bisphenol-base epoxy resin (X) having an epoxy equivalent weight from 170 to 225 and a bisphenol-base epoxy resin (Y) having an epoxy equivalent weight from 400 to 600 in a molar ratio of X:Y of 0.2:0.8 to 0.4:0.6 is particularly suitable. The reaction of such mixture with the ethylenically unsaturated monocarboxylic acid is conducted in a manner similar to the above-described reaction. The resulting epoxy ester resin is dissolved in the polymerizable monomer to give an epoxy ester resin composition.

The epoxy ester resin composition containing two epoxy resin components with different epoxy equivalents may also be obtainable by simply mixing separately prepared epoxy ester resins or resin compositions.

The polymerization inhibitors of this invention have their most dramatic effect when used with epoxy ester resin compositions prepared from bisphenol-base epoxy resins. Epoxy ester resin compositions prepared from epoxy novolac resin traditionally appear to have relatively shorter storage lives than epoxy ester resins prepared from bisphenol-base epoxy resins.

The following resin compositions were prepared and tested for storage stability at 55° C. and gel times at room temperature and at 82° C. Some storage stability tests were also conducted at 40° C. and at room temperatures. All parts and percentages are by weight unless otherwise specified.

RESIN COMPOSITION A

Resin Composition A was prepared by first blending together at a temperature between 120° and 130° C., 11.3 parts of a diglycidyl ether of bisphenol A having an epoxy equivalent weight of 188 and and 33.15 parts of a diglycidyl ether of bisphenol A having an epoxy equivalent weight of 535. After cooling to 110° C., 9.1 parts of glacial methacrylic acid, 0.0663 part of tris(dimethylaminomethyl)phenol and 0.0115 part of hydroquinone were added to the first product. The reaction mixture was then heated to 115° C. until the carboxylic acid content, as COOH, was between 2 and 3 percent based on the total mixture. Then 1.45 parts of maleic anhydride was added and reacted at 115° C. until the carboxylic acid content was 1 percent. During the reactions of the epoxy groups with the carboxylic acid groups and the secondary hydroxyl groups with the carboxylic acid anhydride groups, air was bled into the reactor to keep the hydroquinone inhibitor active. The reaction product was then cooled and 45 parts of styrene containing 50 parts per million of tertiary butyl catechol was added and mixed with the reaction products.

RESIN COMPOSITION B

Resin Composition B was prepared with the same proportions as for Resin Composition A of the two diglycidyl ethers of bisphenol A, methacrylic acid, maleic anhydride, catalysts and styrene. The same reaction conditions were employed. Resin Composition B contained 130 parts per million of 2-methylhydroquinone in place of the hydroquinone of Resin Composition A.

RESIN COMPOSITION C

Resin Composition C was prepared by reacting 17.7 parts of methacrylic acid with 27.6 parts of an epoxy novolac resin having an epoxy equivalent weight of 179 and with 9.7 parts of a diglycidyl ether of bisphenol A having an epoxy equivalent weight of 189 in the presence of 0.056 part of tris(dimethylaminomethyl)phenol and 0.0165 part of hydroquinone. The reaction mixture was heated with mixing to 115° C. and maintained there until the carboxylic acid content was reduced to 1 percent COOH. Air was bled into the reactor to keep the hydroquinone active. The reaction product was cooled and 45 parts of styrene containing 50 parts per million of tertiary butyl catechol was added and mixed with the reaction products.

Two different accelerated storage stability tests were conducted, one at low oxygen level "anaerobic" condition, the other at high oxygen level.

In general, the testing temperature chosen was 55° C. In some instances, as indicated in the tables of results, Table I and Table II, some tests have been repeated at 40° C. or have been run at 43° C.

For the first test performed at low oxygen level, samples of epoxy resin compositions containing various polymerization inhibitors were placed into glass bottles having a capacity of approximately 100 milliliters. The bottles were filled to 94 percent of their maximum volume at 25° C. The bottles were then tightly sealed with air-proof caps and placed into an oven heated to 55±1° C. The number of days required for the sample to gel was recorded. This test is representative of actual storage conditions of resins contained in air-tight drums filled to 94 percent of their volume. In this test, only low levels of oxygen are available for the activation of the inhibitors added to the resin.

For the second test performed at high oxygen level, the same glass bottles were used but filled to 70 percent of their volume only. In the second test, the cap of the bottles was removed each day to exchange the gas in the vapor space with fresh air. The cap was then replaced and the sample continued to be kept at 55° C. This test is representative of actual bulk storage facility conditions where resins contained in large tanks can easily be aerated with a slow, continuous stream of air leading into the tank. The number of days required for the sample to gel was again recorded.

The reactivity of the various unsaturated epoxy ester resin compositions was evaluated in the presence of polymerization initiators using two standard gel time tests.

For the gel time test at room temperature, a 100 milliliter sample of an epoxy ester resin composition containing 1.5 parts of a 60 percent solution of methyl ethyl ketone peroxide in dimethyl phthalate, per 100 parts of resin composition and 0.5 part of a solution of cobalt naphthenate containing 6 percent cobalt per 100 parts of resin composition was placed in a gelation timer equipped with a reciprocating plunger. When the viscosity increased to the point where the plunger could no longer reciprocate, the timer was stopped and the time thereon was recorded as the gel time.

For the gel time test at 82° C., dibenzoyl peroxide was first mixed with a sample of an epoxy ester resin composition in proportions to provide 1 part of catalyst per 100 parts of resin composition. An 18×150 millimeter test tube which contained 12.5 milliliters of the catalyzed resin composition was placed in an 82° C. (180° F.) constant temperature bath. A thermocouple was inserted in the sample. The number of minutes for the sample to increase in temperature from 66° C. (150° F.) to 88° C. (190° F.) was recorded as the gel time at 82° C.

The storage stability tests and the gel time tests were run on samples of Resin Compositions A, B and C containing polymerization inhibitors which were added after the resin composition was prepared. The results are shown in Tables I and II. Inhibitors D through M are identified as follows:

| Inhibitor | Chemical Name |
|---|---|
| D | 4-chloro-2-nitrophenol |
| E | 2-nitrophenol |
| F | 2,4-dinitrophenol |
| G | 2,4-dinitro-6-secondary butyl phenol |
| H | 2,4-dichloro-6-nitrophenol |
| I | 2-methylhydroquinone |
| J | phenothiazine |
| K | p-methoxyphenol |
| L | 2-chloro-4-nitrophenol |
| M | tetramethylthiuram disulfide |

TABLE I

Bisphenol A-Base Epoxy Ester Resins

| | | Examples | | | | | | | | |
|---|---|---|---|---|---|---|---|---|---|---|
| | | 1 | 2 | 3 | 4 | 5 | 6 | 7 | 8 | 9 |
| Epoxy Ester Resin | | A | B | A | B | B | A | B | A | B |
| Inhibitor | D | 200 | 200 | 200 | 200 | 100 | 200 | 200 | 300 | |
| (Parts Per Million | E | | | | | | | | | |
| Parts of Resin | F | | | | | | | | | |
| Composition) | G | | | | | | | | | |
| | H | | | | | | | | | 250 |
| | I | | | 100 | 100 | | 100 | 100 | | |
| | J | | | | | 150 | 150 | 150 | 150 | 150 |
| Storage Stability at 55° C. with no aeration, 94% full, days | | 13 | 14 | 20 | 20 | 13 | 20 | 21 | 16 | 14 |
| Storage stability at 55° C. with daily aeration, 70% full, days | | 11 | 13 | 27 | 25 | 60 | 63 | 70 | 90 | 60 |
| Gel Time at Room Temperature, minutes (methylethyl-ketone peroxide) | | 13.3 | 13.2 | 15.7 | 14.2 | 12.0 | 21.4 | 17.5 | 20.9 | 21.2 |
| Gel Time at 82° C., minutes (dibenzoyl-peroxide) | | 19.5 | 14.6 | 25.0 | 19.0 | 7.7 | 30.0 | 25.2 | 27.2 | 25.2 |
| Storage stability at 40° C. with no aeration, 94% full, days | | | | | | | 85 | 90 | | |

| | | Comparative Runs | | | | | | | | | |
|---|---|---|---|---|---|---|---|---|---|---|---|
| | | A | B | C | D | E | F | G | H | I | J | K |
| Epoxy Ester Resin | | A | A | A | B | A | A | A | A | B | B | B |
| Inhibitor | E | | | | | | | | | 200 | | |
| (Parts Per Million | F | | | | | | | | | | 200 | |
| Parts of Resin | G | | | | | | | | | | | 200 |
| Composition | I | 100 | 200 | | | | | | 150 | 100 | 100 | 100 |
| | J | | | 150 | 150 | | 150 | | 150 | | | |
| | K | | | 200 | 200 | | | | | | | |
| | L | | | | | 200 | 200 | | | | | |
| | M | | | | | | | 200 | 200 | | | |
| Storage Stability at 55° C. with no | | 6 | 7 | 6 | 7 | 3 | 6 | 3 | 6 | 14 | 20 | 20 |

TABLE I-continued

| Bisphenol A-Base Epoxy Ester Resins | | | | | | | | | | | |
|---|---|---|---|---|---|---|---|---|---|---|---|
| aeration, 94% full, days | | | | | | | | | | | |
| Storage stability at 55° C. with daily aeration, 70% full, days | 20 | 27 | 55 | 35 | | | | | 35 | 25 | 26 |
| Gel Time at Room Temperature, minutes (methylethyl-ketone peroxide) | 16.2 | 18.1 | 17.0 | 16.2 | 12.0 | 13.6 | 9.4 | 13.8 | 14.7 | 29.6 | 22.8 |
| Gel Time at 82° C., minutes (dibenzoyl-peroxide) | 11.6 | 14.3 | 11.3 | 11.0 | 7.5 | 10.0 | 5.5 | 11.0 | 20.7 | | |
| Storage stability at 40° C. with no aeration, 94% full, days | | | 25 | 28 | | | | | | | |

TABLE II

| | Novolac-Base Epoxy Ester Resins | | | | |
|---|---|---|---|---|---|
| | Examples | | Comparative Runs | | |
| Epoxy Ester Resin | 10 C | 11 C | L C | M C | N C |
| Inhibitor (Parts Per Million Parts of Resin Composition) | D 200 J 150 M | 100 100 | 200 | 400 | 200 200 |
| Storage Stability at 55° C. with no aeration, 94% full, days | 7 | | 3 | | 2 |
| Storage stability at 43° C. with daily aeration, 70% full, days | | 19 | | 11 | |
| Gel Time at Room Temperature, minutes (methylethyl-ketone peroxide) | 13.8 | 13.9 | 12.0 | 12.4 | 10.2 |
| Gel Time at 82° C., minutes (dibenzoyl-peroxide) | 14.5 | 12.2 | 11.1 | 10.9 | 9.5 |

Comparative Runs A through H and L demonstrate that the conventional polymerization inhibitors are ineffective in providing any long-term stability under low oxygen conditions.

A comparison of Examples 5 through 9 with Comparative Runs C and D shows that phenothiazine enhances the stability of bisphenol-base epoxy ester resin compositions only in high concentrations of oxygen. 4-chloro-2-nitrophenol and 2,4-dichloro-6-nitrophenol are clearly shown to enhance the stability of both the bisphenol-base epoxy resins and novalac-base epoxy ester resin.

Japanese Patent Publication No. 52-108478/1977 suggests that ortho-, meta-, and para-nitrophenols are all effective in reducing the heat generated during gel formation. Comparative Runs E and F show that 4-nitro-2-chlorophenol is ineffective as an anaerobic polymerization inhibitor.

Comparative Run I shows that the use of O-nitrophenol results in shorter storage stability at 55° C. without aeration compared with Examples 3, 4, 6 and 7. Comparative Runs J and K show that the use of 2,4-dinitrophenol and 2,4-dinitro-6-sec-butylphenol results in much longer gel times at room temperature compared with Example 4. Dinitrophenols are highly colored chemicals which also make them less useful as polymerization inhibitors.

Novolac-base epoxy ester resins, while known as being more difficult to stabilize for long-term storage stability show a dramatic improvement in stability with the use of 4-chloro-2-nitrophenol in Examples 10 and 11 when compared with Comparative Runs L and M.

What is claimed is:

1. A thermosettable ethylenically unsaturated epoxy ester resin composition having improved storage stability comprising the reaction product of a bisphenol-base epoxy resin, a novolac-base epoxy resin, or mixtures thereof with an ethylenically unsaturated monocarboxylic acid dissolved in a polymerizable monomer containing a >C=CH$_2$ group and an anaerobically effective polymerization selected from the group consisting of 4-chloro-2-nitrophenol, 2,4-dichloro-6-nitrophenol, and mixtures thereof.

2. The thermosettable resin composition of claim 1 wherein the polymerization inhibitor is present in the range of 10 to 5,000 parts by weight per million parts by weight of resin composition.

3. The thermosettable resin composition of claim 1 or 2 wherein the polymerization inhibitor is 4-chloro-2-nitrophenol.

4. A method for improving the storage stability of thermosettable ethylenically unsaturated epoxy ester resin compositions by adding an anaerobically effective polymerization inhibitor selected from the group consisting of 4-chloro-2-nitrophenol, 2,4-dichloro-6-nitrophenol, and mixtures thereof to the thermosettable resin composition, the thermosettable resin composition comprising the reaction product of a bisphenol-base epoxy resin, a novolac-base epoxy resin, or mixtures thereof with an ethylenically unsaturated monocarboxylic acid dissolved in a polymerizable monomer containing a >C=CH$_2$ group.

5. The method of claim 4 wherein the polymerization inhibitor is employed in the range of from 10 to 5,000 parts by weight per million parts by weight of resin composition.

6. The method of claim 4 or 5 wherein the polymerization inhibitor is 4-chloro-2-nitrophenol.

* * * * *

UNITED STATES PATENT AND TRADEMARK OFFICE
CERTIFICATE OF CORRECTION

PATENT NO.  : 4,413,105
DATED       : November 1, 1983
INVENTOR(S) : Raymond Koenig It is certified that error appears in the above—identified patent and that said Letters Patent is hereby corrected as shown below:

Title Page, Item [73]: "The Dow Chemical Company, Midland, Mich." should read:
--Dow Chemical Rheinwerk G.M.B.H., Rheinmuenster, West Germany--

Col. 1, Line 15:    delete "inhibitor"

Col. 2, Line 29:    "monocaboxylic" should read --monocarboxylic--

Col. 4, Line 33:    "chlorenddic" should read --chlorendic--

Col. 6, Line 6:     Delete "and" second occurence

Claim 1, Line 38:   Insert the word --inhibitor-- after the word polymerization

Signed and Sealed this

Twenty-seventh Day of March 1984

[SEAL]

Attest:

GERALD J. MOSSINGHOFF

Attesting Officer    Commissioner of Patents and Trademarks